United States Patent Office 3,247,382
Patented Apr. 19, 1966

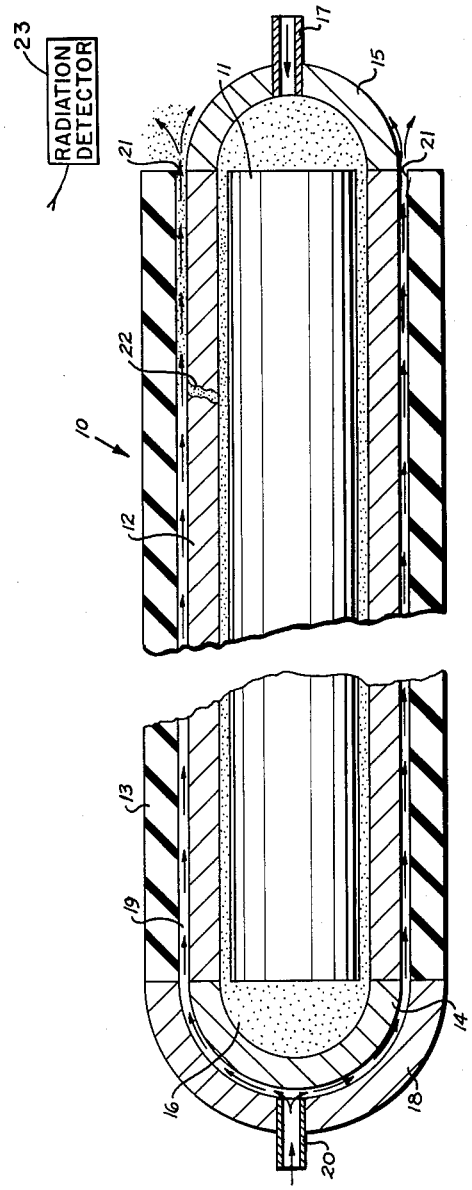

3,247,382
METHODS OF LOCATING LEAKS IN MULTIJACKETED CABLE SHEATHS WITH RADIOACTIVE GASES
Luther K. Schneider, Rodgers Forge, Md., assignor to Western Electric Company, Incorporated, New York, N.Y., a corporation of New York
Filed Sept. 4, 1962, Ser. No. 221,117
3 Claims. (Cl. 250—83.3)

This invention relates to a method of locating leaks in an inner sheath of a multijacketed cable and particularly to a method for locating leaks in an inner sheath of a multijacketed cable by the use of radioactive gases.

In detecting leaks in an inner sheath of a multijacketed cable by the use of radioactive gases, difficulty is experienced in pin pointing the location of the leaks. As the gas escapes through the leak, it tends to diffuse along the cable, thereby obscuring the exact location of the leak.

It is an object of the present invention to provide a method of locating leaks in an inner sheath of a multijacketed cable.

Another object of the present invention is to provide a method for accurately pin pointing leaks in an inner sheath of a multijacketed cable utilizing radioactive gas.

With these and other objects in view, this invention contemplates a method of locating leaks in an inner sheath of a multijacketed cable by introducing a radioactive gas into a sealed inner sheath under a predetermined pressure, flowing a nonradioactive gas over the inner sheath of the cable, and detecting any radioactive gas leaking from the inner sheath along the length of the cable. The nonradioactive gas sweeps the leaking radioactive gas along the cable so that there will be a detectable difference in radiation at the point of the leak in the sheath.

Other objects and advantages of the present invention will be apparent from the following detailed description when considered in conjunction with the accompanying drawing showing a schematic sectional view of a cable embodying the principles of the method of the present invention.

In the drawing, a multijacketed cable is generally indicated by the numeral 10. A conductor core 11 is surrounded by an inner sheath 12 and an outer sheath 13. The inner sheath 12 is hermetically sealed at both ends by seals 14 and 15. The seals may be attached to the inner sheath 12 in any suitable manner such as by soldering, threading the seals into the sheath or by crimping. A radioactive gas 16 is introduced through a port 17 under a predetermined pressure. Any suitable radioactive gas may be utilized which will be shielded by the inner sheath. The outer sheath 13 is hermetically sealed at one end by seal 18. A nonradioactive gas 19 is introduced through a port 20 so as to flow towards the unsealed end 21 of sheath 13.

This invention may be practised on any multijacketed cable having an inner sheath of a denser material than the outer sheaths. An example of such a cable is one which has a lead inner sheath with a polyethylene outer sheath, such as is used in duct installations where corrosive problems are present. PAP exchange cable, where an aluminum sheath is placed over a polyethylene sheath and an outer sheath of polyethylene is placed over the aluminum sheath, is still a further example. As the aluminum sheath is merely overlapped, gas escaping from the inner polyethylene sheath could leak through the aluminum sheath along its entire length, whereby leaks would be accurately pin pointed by the instant invention.

Since the inner sheath acts as a radiation shield for the radioactive gas sealed therein, a radiation-sensitive detector will register a reading from the radioactive gas when there is a leak in the inner sheath which permits the radioactive gas to escape therefrom. The radioactive gas is therefore placed under a pressure which is greater than the pressure of the nonradioactive gas surrounding the inner sheath so that the radioactive gas will flow through a leak in the inner sheath.

It is not necessary for the inner sheath to completely block or shield all radiation from the radioactive gas. Any radiation normally escaping from the inner sheath may be considered as background radiation in calibrating the radiation-sensitive detector. Therefore, any radiation received by the detector which is above this background level will indicate the existence of a leak in the cable.

As the sheath 12 will shield the radioactive gas 16 at least partially, radioactive gas escaping from the inner sheath 12 through a leak such as at 22 will produce a radiation level substantially higher than when no leak is present. Therefore, a properly calibrated radiation-sensitive detector 23 will indicate the presence of a leak. Further, as any radioactive gas which escapes from the inner sheath 12 will be forced toward the unsealed end 21 of the outer sheath 13 by the flow of nonradioactive gas 19, the exact location of the leak can be readily pin pointed. An inspector would know at once that the leak was at that point closest to the sealed end of sheath 13 at which he received a reading on a radiation-sensitive detector above the background level.

The above-described methods and structural arrangements are simply illustrative of an application of the principles of the invention and many other modifications may be made without departing from the invention.

What is claimed is:
1. A method of locating holes in an inner sheath of a multijacketed cable which comprises the steps of:
  filling an inner sheath that normally provides complete shielding for radioactive gas contained within the inner sheath with a radioactive gas under a predetermined pressure so that radioactive gas will escape through a hole in the inner sheath,
  flowing a nonradioactive gas across the exterior of the inner sheath so as to direct radioactive gas escaping from the inner sheath through a hole therein towards a predetermined end of the cable,
  detecting escaping radioactive gas along the cable, and locating the point at which radioactive gas is detected lying closest to the end of the cable from which the nonradioactive gas is directed across the inner sheath.
2. A method of locating leaks in an inner sheath of a multijacketed cable which comprises the steps of:
  filling a sealed inner sheath that normally provides complete shielding for radioactive gas contained within the inner sheath with a radioactive gas under a predetermined positive pressure,
  flowing a nonradioactive gas from one end of the cable across the exterior of the inner sheath to the opposite end of the cable whereby radioactive gas escaping from the inner sheath will be directed toward said opposite end of the cable,
  detecting escaping radioactive gas along the cable, and locating the point at which radioactive gas is detected lying closest to the end of the cable from which the nonradioactive gas is directed across the inner sheath.
3. A method of locating leaks in an inner sheath of a multijacketed cable which comprises the steps of:
  sealing the ends of an inner sheath that normally provides complete shielding for radioactive gas contained within the inner sheath,
  introducing a radioactive gas under predetermined pressure into said inner sheath, sealing one end of an outer sheath,
introducing nonradioactive gas through said sealed end of the outer sheath under a predetermined pressure whereby radioactive gas escaping from the inner sheath will be swept toward the unsealed end of an outer sheath by the nonradioactive gas,
detecting escaping radioactive gas along the length of the cable, and
locating the point at which the radioactive gas is detected lying closest to the sealed end of the outer sheath.

References Cited by the Examiner

UNITED STATES PATENTS

| | | | |
|---|---|---|---|
| 2,518,327 | 8/1950 | Jahn | 250—106 |
| 2,844,735 | 1/1958 | Creutz | 250—106 |
| 2,999,162 | 9/1961 | Fearon | 250—83.6 |

FOREIGN PATENTS 679,928 9/1952 Great Britain.

RALPH G. NILSON, *Primary Examiner.*

JAMES W. LAWRENCE, *Examiner.*